United States Patent [19]

Ina

[11] 4,453,686

[45] Jun. 12, 1984

[54] TRIPOD

[76] Inventor: Tatsuo Ina, 22-11 Sendagi 1-chome, Bunkyo-ku, Tokyo, Japan, 112

[21] Appl. No.: 285,129

[22] PCT Filed: Nov. 28, 1980

[86] PCT No.: PCT/JP80/00291

§ 371 Date: Jul. 21, 1981

§ 102(e) Date: Jul. 21, 1981

[87] PCT Pub. No.: WO81/01601

PCT Pub. Date: Jun. 11, 1981

[51] Int. Cl.³ ............................................ F16M 11/38
[52] U.S. Cl. .................................. 248/168; 248/188.6
[58] Field of Search ............... 248/168, 523, 435, 434, 248/169, 170, 171, 188.6

[56] References Cited

U.S. PATENT DOCUMENTS 3,963,207  6/1976  Guasti ................................. 248/168
4,196,881  4/1980  Davidson ........................ 248/435 X

FOREIGN PATENT DOCUMENTS 2256125  4/1974  Fed. Rep. of Germany ...... 248/168
2366509  6/1978  France .............................. 248/188.6
 639326  6/1950  United Kingdom ................ 248/168
2035068  6/1980  United Kingdom ................ 248/168

*Primary Examiner*—J. Franklin Foss
*Attorney, Agent, or Firm*—George B. Oujevolk

[57] ABSTRACT

This invention relates to a tripod for cameras, which is capable of regulating an angle at which the leg units thereof are opened, to thereby allow an object to be photographed at a low angle, and which consists of a tripod head, leg units each of which is oscillatably supported on the tripod head and each of which has projections at that end portion thereof which is above the oscillatably supported portion thereof, and regulators each of which is supported on a shaft in such a manner that the regulator is urged in a direction at right angles to the relative leg unit and each of which has alternately-arranged projections and recesses in that position thereon which is on the side of the tripod head and in opposition to the projections provided on the relative leg unit, the projections provided on the leg units coming into contact, when the leg units are opened in the usual condition, with the projections provided on the regulators, to thereby allow the leg units to be set at the most-frequently-used leg-opening angle, the projections provided on the leg units coming into engagement, when the leg units are opened after the regulators have been displaced in the direction at right angles to the leg units against the urging forces applied thereto, with the recesses provided in the regulators, to thereby allow the leg units to be set at an increased leg-opening angle, the regulators which have been displaced in the mentioned manner being returned to their respective original positions when the leg units are thereafter closed.

7 Claims, 8 Drawing Figures

TRIPOD

DESCRIPTION

1. Technical Field:

This invention relates to a tripod for cameras, which is suitably used for photographing cameras and television cameras.

2. Background Art:

Almost all conventional tripods of this kind for cameras have only one leg-opening angle. There are an extremely small number of tripods which permit a leg-opening angle thereof to be regulated but all of such tripods have a very complicated construction, so that they cannot be handled easily.

3. Disclosure of Invention:

An object of this invention is to provide a simply-constructed tripod for cameras, which permits a leg-opening angle thereof to be regulated, and which can be handled easily.

In order to achieve the above object, this invention provides a tripod for cameras, comprising a tripod head, leg units each of which is oscillatably supported on the tripod head and each of which has projections at that end portion thereof which is above the oscillatably supported portion thereof, and regulators each of which is supported on a shaft in such a manner that the regulator is urged in a direction at right angles to the relative leg unit and each of which has alternately-arranged projections and recesses in that position thereon which is on the side of the tripod head and in opposition to the projections provided on the relative leg unit, the projections provided on the leg units coming into contact, when the leg units are opened in the usual condition, with the projections provided on the regulators, to thereby allow the leg units to be set at the most-frequently-used leg-opening angle, the projections provided on the leg units coming into engagement, when the leg units ae opened after the regulators have been displaced in the direction at right angles to the leg units against the urging forces applied thereto, with the recesses provided in the regulators, to thereby allow the leg units to be set at an increased leg-opening angle, the regulators which have been displaced in the mentioned manner being returned to their respective original positions when the leg units are thereafter closed.

In order to use in the usual condition the tripod of the above-described construction according to the present invention, the leg units thereof can be set at the most-frequently-used angle without carrying out any special operations therefor. Accordingly, the tripod can be used in a stable condition. Also, the tripod permits the leg units thereof to be opened at a larger angle to allow an object to be photographed at a low angle by a camera set thereon.

BRIEF DESCRIPTION OF DRAWINGS

The accompanying drawings show a mode of embodiment of this invention, wherein.

BEST MODE FOR CARRYING OUT THE INVENTION

Figure 1:
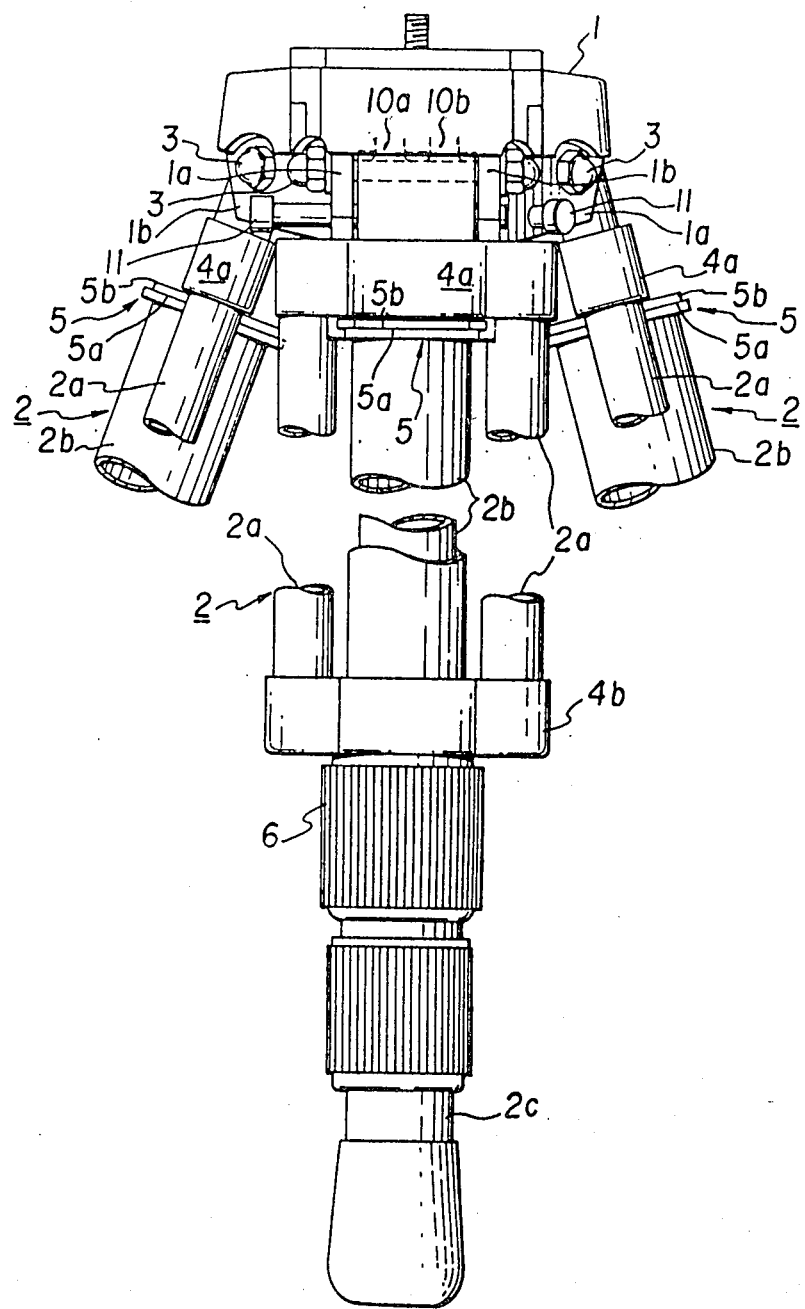
FIG. 1 is a partially cutaway front elevational view of a tripod.
Figure 2:
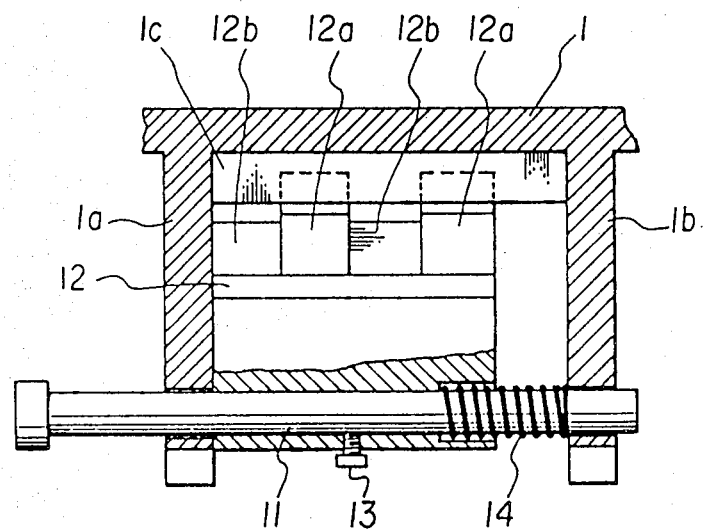
FIG. 2 is a front elevational view of a part of the tripod.
Figure 3:
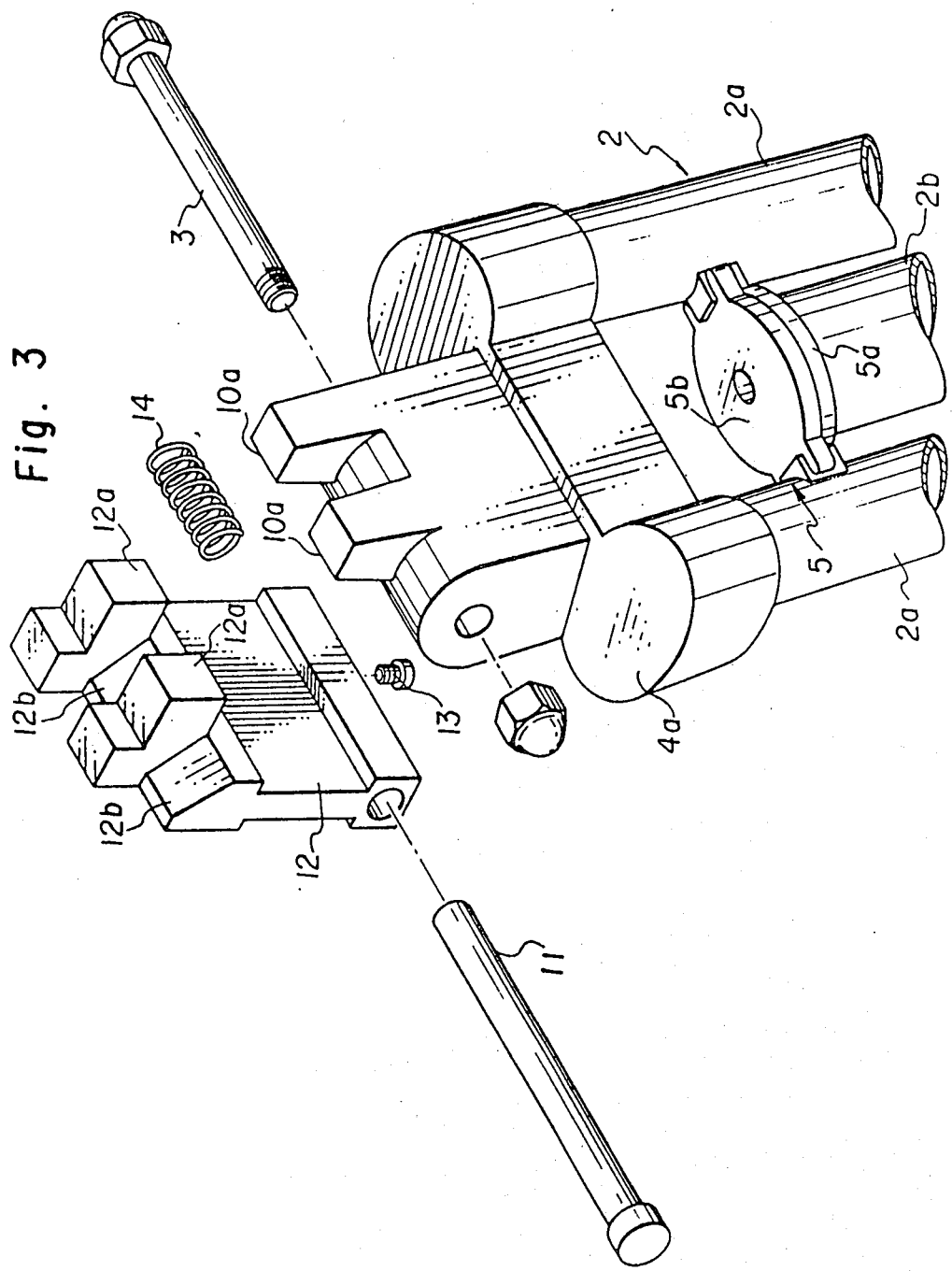
FIG. 3 is an exploded view in perspective of a part of a part of the tripod.

The best mode for carrying out the invention will now be described. Leg units 2 are oscillatably supported via shafts 3 between support walls 1a, 1b, which are provided at a lower portion of a tripod head 1 in such a manner as to be extended in three directions. Each of the leg units 2 consists of main legs 2a, a first auxiliary leg 2b, and a second auxiliary leg 2c. The main legs 2a consist of two thinner pipes, which are joined at their respective both end portions to an upper connector 4a and a lower connector 4b, the upper connector 4a being supported via a shaft on the support walls 1a, 1b. The first auxiliary leg 2b consists of a tubular element, and is slidably held between the two thinner pipes constituting the main legs 2a, via a mounting bore (not shown) provided in the lower connector 4b for the main legs 2a. A locking unit 5 for preventing the lateral oscillations of the first auxiliary leg 2b is provided at that end portion thereof which is held between the main legs 2a. As best seen from FIG. 7, the locking unit 5 is adapted to be fixed to the lower connector 4b via a wedge ring 7 by tightening a nut 6 screwed to a lower portion of the lower connector 4b. As best seen from FIG. 8, the locking unit 5 consists of a buffer member 5a and a holding nut 5b, which are mode of, for example, a plastic. The second auxiliary leg 2c also consists of a tubular element, and is slidably held in the interior of the first auxiliary leg 2b. The second auxiliary leg 2c is adapted to be fixed to the first auxiliary leg 2b via a wedge ring 9 by tightening a nut 8.

A plurality of projections 10a, 10a are provided at an upper end portion of the leg unit 2, i.e., at that portion of the leg unit 2 which is above a fulcrum of a shaft-supported end portion of the upper connector 4a for the main leg 2a.

On the other hand, a support shaft 11 is provided between the support walls 1a, 1b. The support shaft 11 is positioned on the inner side of the leg unit 2 and adapted to be moved axially, i.e. in a direction at right angles to the leg unit 2. A regulator 12 is fixedly mounted on the support shaft 11 with a screw 13. The regulator 12 is urged by a coiled compression spring 14, which is resiliently secured to the support wall 1b at it is fitted around the support shaft 11, in such a manner that the regulator 12 is moved to left with the support shaft 11. The regulator 12 is provided in that position thereon which is opposed to the projections 10a, 10a with projections 12a, 12a and recesses 12b, 12b, which can be engaged alternately with the projections 10a, 10a when the regulator 12 is moved. Those portions of the projections 12a, 12a which can be engaged with the projections 10a, 10a are formed at 90°, and those portions of the recesses 12b, 12b which can be engaged with the projections 10a, 10a are inclined at, for example, 45°.

Figure 4:
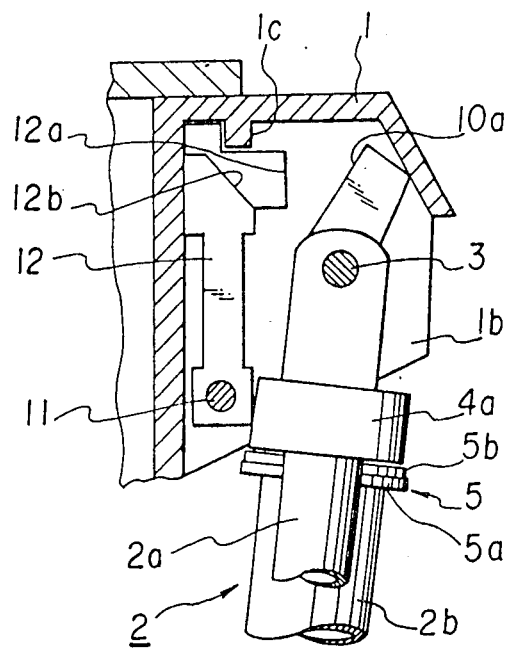
FIG. 4 is a side elevational view in section of a part of the tripod.
Figure 5:
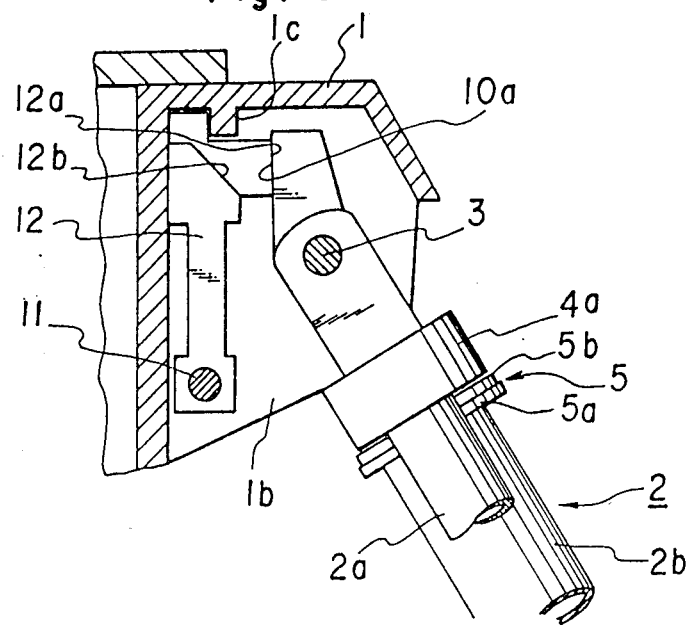
FIG. 5 is a side elevational view in section of a part of the tripod with leg units thereof displaced.
Figure 6:
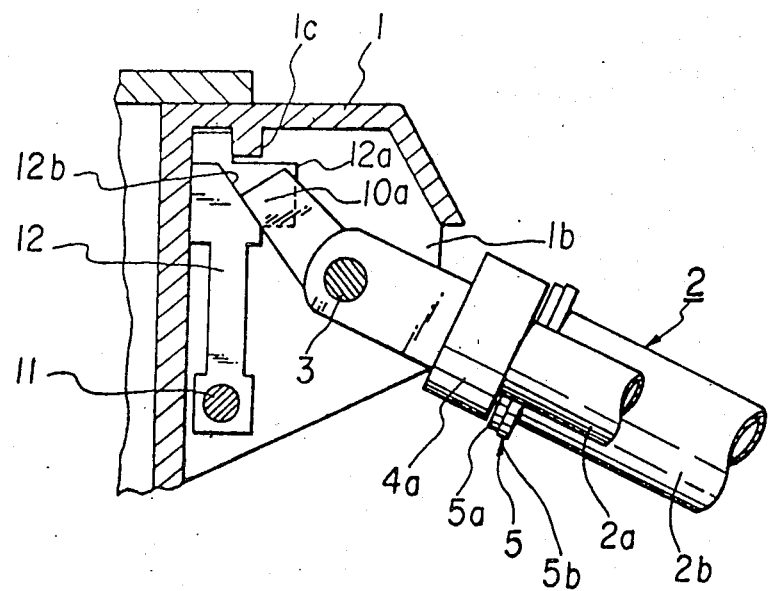
FIG. 6 is a side elevational view in section of a part of the tripod with leg units thereof displaced.

The operation and effect of this invention will now be described. While the leg unit 2 is closed, the projections 10a, 10a are positioned away from the projections 12a, 12a of the regulator 12 as best seen from FIG. 4. When the leg unit 2 is drawn outwardly, it is oscillated about the support shaft 3 serving as a fulcrum, to be stopped the moment the projections 10a, 10a come into contact with the projections 12a, 12a as best seen from FIG. 5, since the regulator 12 is kept in the same position owing to the coiled compression spring 14. The angle at which the leg unit is thus opened is the most-frequently-used angle.

In order to further open the leg unit for taking a picture of an object at a low angle, it is preferable that the leg unit 2 be closed once to thereafter press a head portion of the support shaft 11 in the rightward direction against the resilient force of the coiled compression spring 14. Consequently, the regulator 12 is moved with the support shaft 11 to allow the recesses 12b, 12b to be opposed to the projections 10a, 10a. When the leg unit 2 is then drawn outwardly, it is oscillated until the projections 10a, 10a has come into engagement with the recesses 12b, 12b. Accordingly, the angle of the leg unit 2 thus opened is greater than that in the case previously described, so that a camera can be set in a lower position.

In order to close the leg unit 2, which has been opened in such a larger angle as mentioned above, it has only to be pressed in the closing direction. The leg unit 2 can thus be closed smoothly. When the leg unit 2 has been closed at a predetermined angle, the projections 10a, 10a and the recesses 12b, 12b are disengaged from one another. As a result, the regulator 12 is moved axially and automatically in the leftward direction by the resilient force of the coiled compression spring 14, to be returned to the original position. Therefore, when the leg unit 2 is opened again, it is found in an automatically reset state, in which the leg unit 2 is ready to be opened at the most-frequently-used angle. A projection 1c extending perpendicularly in the downward direction from an inner stationary portion of the tripod head 1 so as to allow a part of the regulator 12 to be engaged therewith serves to prevent the oscillation of the regulator 12 and effect a smooth movement of the regulator 12 returning to the original position when the leg unit 2 is closed. Needless to say, the oscillation of the regulator 12 can also be prevented by employing an angular shaft as the support shaft 11.

Figure 7:
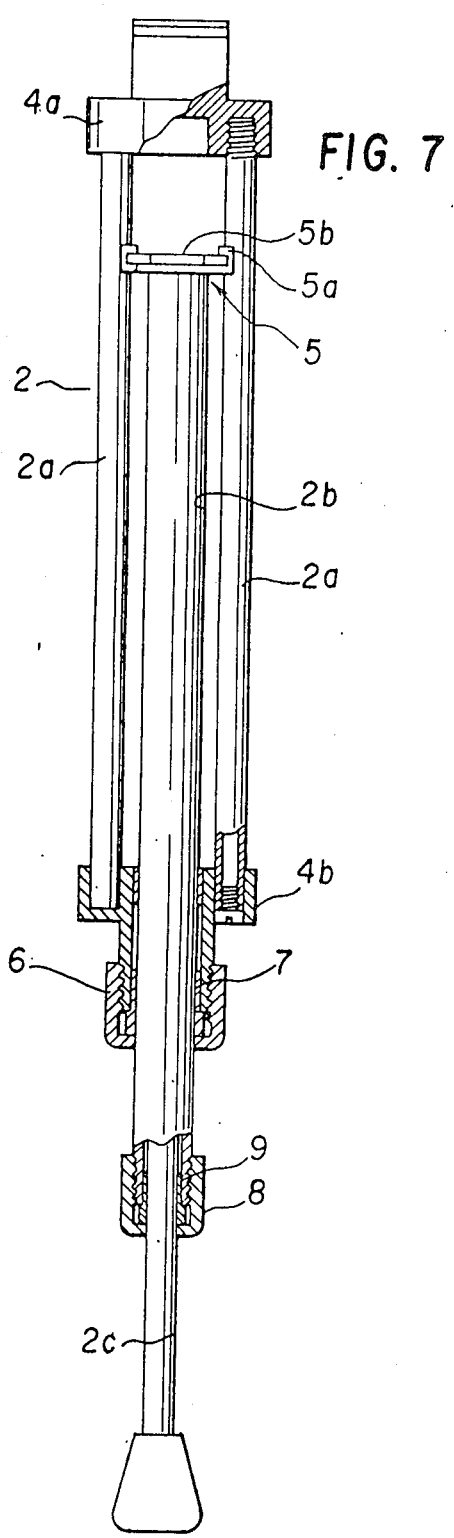
FIG. 7 is a partially sectional view of a leg unit.
Figure 8:
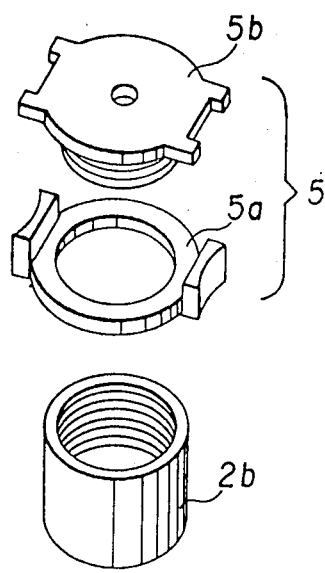
FIG. 8 is an exploded view in perspective of a locking unit.

The first auxiliary leg 2b and the second auxiliary leg 2c, which are best seen from FIG. 7, can be extended and contracted freely in the vertical direction by loosening the nut 6 or 8. While such a leg-extending or contracting operation is conducted, the first auxiliary leg 2b does not collide noisily with the upper connector 4a owing to the buffer member 5a projected from an upper end portion of the first auxiliary leg 2b. Owing to the locking unit consisting of this buffer member 5a, no grating sounds are generated in the first auxiliary leg 2b. Since the first auxiliary leg 2b is held by the pipes constituting the main legs 2a, it neither shakes nor takes an unstable posture.

The leg unit 2 consisting of apparently three pipes, in which the second auxiliary leg 2c has been fully retracted into the first auxiliary leg 2b, is strong enough to stably support a heavy camera, such as a television camera.

What is claimed is:

1. A tripod for cameras, comprising in combination:
   (a) a tripod head (1) with sides and a lower portion, support walls (1a, 1b) at said lower portion;
   (b) elongated leg units (2), said leg units being pivotally supported on said tripod head (1), said leg units (2) having an upper portion and an outer end above said upper portion, pivot means (3) at said upper portion for pivoting said leg units;
   (c) projections (10a, 10b) at said outer ends;
   (d) a support shaft (11) supported by said support walls (1a, 1b) for each leg unit;
   (e) regulators (12) for each leg unit with spring means (16), each of which is supported on said shaft (11) in such a manner that the regulator (12) is urged in a direction at right angles to the corresponding elongated leg unit (2); and,
   (f) alternately-arranged projecting means (12a, 12a) and recesses (12b, 12b) on each regulator, disposed on one side of said tripod head (1) and opposite said projections (10a, 10a) so that said projections come into contact with said regulators when said leg units (2) are opened in the usual condition, to thereby allow said leg units to be set at the most-frequently-used leg-opening angle, said projections (10a, 10a) provided on the leg units comming into engagement, when said regulators have been displaced in the direction at right angles to the leg units (2) against the spring means forces applied thereto, to allow the leg units (2) to be set at an increased leg-opening angle, said regulators (12) which have been displaced in the manner mentioned being returned to their original position when the leg units (2) are thereafter closed.

2. A tripod according to claim 1, wherein each of said leg units consists of a main leg (21) composed of two pipes with end portions joined at the respective end portions to upper and lower connectors (4a, 4b), a first auxiliary leg (2b) disposed between said main legs (2a) so as to be extended through said lower connector (4b) and a second auxiliary leg (2c) retractably fitted into said first auxiliary leg (2b), said projections (10a, 10a) being provided on said upper connectors.

3. A tripod according to claim 2, wherein each of said first auxiliary (2b) which extend between said main legs (2a) is provided at the upper end portion thereof with a locking unit (5) for holding said main leg (2a) onto said auxiliary leg (2b).

4. A tripod for cameras according to claim 3, wherein each of said locking units (5) has a buffer member (5a).

5. A tripod for cameras; comprising a tripod head (1) having support walls (1a, 1b); leg units (2) each of which is oscillatably supported via shaft (3) between said support walls (1a, 1a) and each of which has projections (10a, 10a) at that end portion thereof; support shafts (11) each of which is slidable mounted between said support walls in parallel with said shaft (3); regulators (12) each of which is mounted on said support shaft (11) and each of which has projections (12a, 12a) and recesses (12b, 12b); and springs (14) each of which is interposed between said regulator and one of said support walls; wherein said projections (10a, 10a) coming into contact, when said leg units (2) are opened in the usual condition, with said projections (12a, 12a), to thereby allow said leg units (2) to be set at the most-frequently-used leg-opening angle; said projections (10a, 10a) coming into contact, when said regulators (12) are moved in one direction against the biasing forces applied thereto, with said recesses (12b, 12b), to thereby allow said leg units (2) to be set at an increased leg-opening angle; said regulators (12) which have been displaced in the mentioned manner being returned to their respective original positions when said leg units (2) are thereafter closed.

6. A tripod for cameras according to claim 5; wherein each of said leg units consists of main legs (2a) composed of two pipes joined at their respective both end portions to upper and lower connectors (4a, 4b); a first auxiliary leg (2b) provided between said main legs (2a) so as to be extended through said lower connector (4b), said first auxiliary leg (2b) is adapted to be fixed to said lower connector (4b) via a wedge ring (7) by tightening a nut (6) screwed to a lower portion of said lower connector (4b) from axial direction; a locking unit (5) mounted on an upper portion of said first auxiliary leg (2b) so as to engage with said main legs (2a); and a second auxiliary leg (2c) retractably fitted into said first auxiliary leg (2b), said second auxiliary leg (2c) is adapted to be fixed to said first auxiliary leg (2b) via a wedge ring (9) by tightening a nut (8).

7. A tripod for cameras according to claim 6, wherein each of said locking unit (5) consists of a buffer member (5a) and a holding nut (5b).

* * * * *